Figure 1:
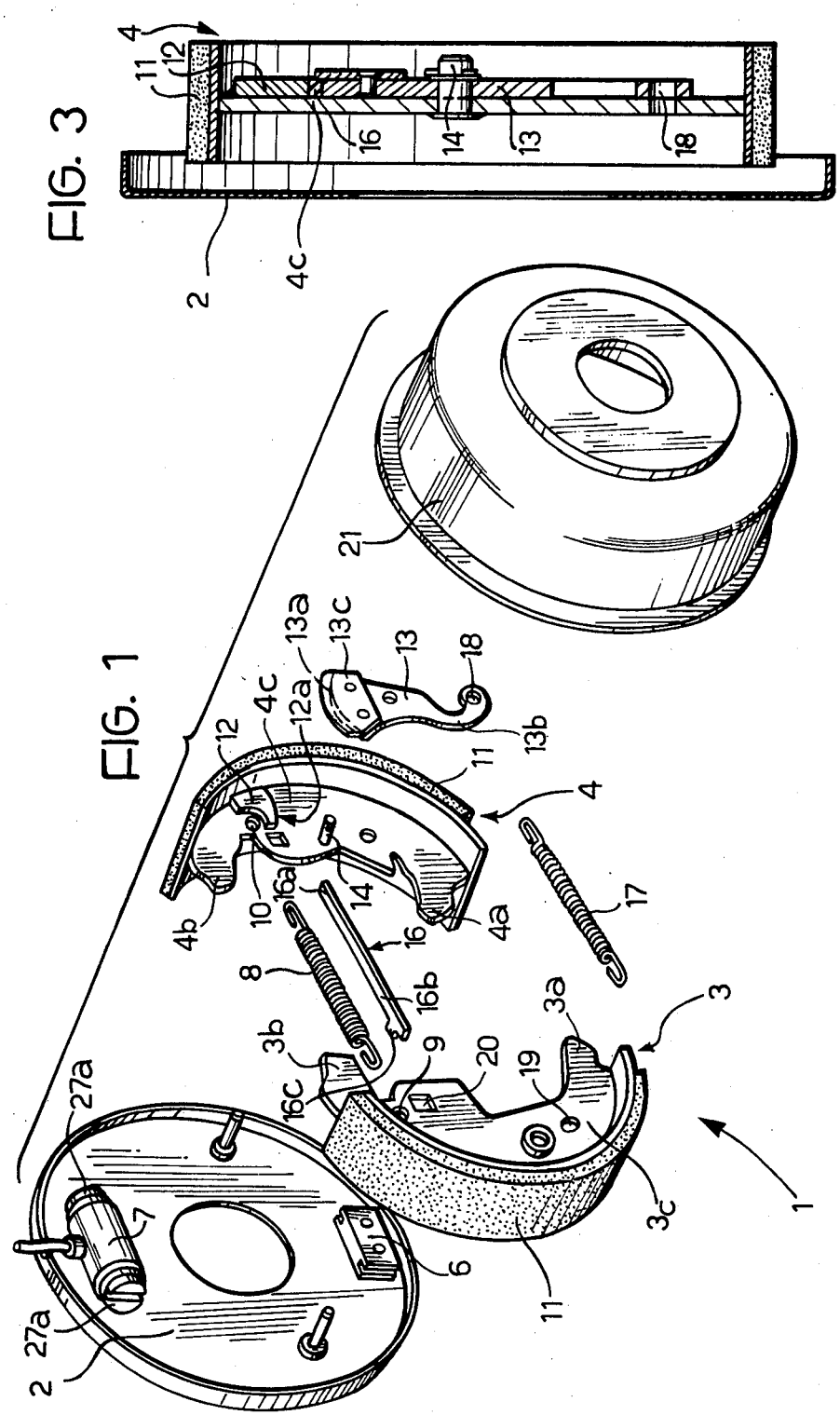

United States Patent [19]

Fasano

[11] 4,061,210
[45] Dec. 6, 1977

[54] DEVICE FOR AUTOMATICALLY COMPENSATING FOR WEAR IN THE BRAKING SYSTEMS OF MOTOR VEHICLES

[75] Inventor: Osvaldo Fasano, Villarbasse (Turin), Italy

[73] Assignee: Start S.p.A. Studi Apparecchiature e Richerche Tecniche, Turin, Italy

[21] Appl. No.: 746,028

[22] Filed: Nov. 30, 1976

[30] Foreign Application Priority Data

Dec. 1, 1975 Italy .................................. 69952/75

[51] Int. Cl.² ............................................ F16D 65/54
[52] U.S. Cl. ............................. 188/79.5 P; 188/196 P
[58] Field of Search ................... 188/79.5 B, 79.5 K, 188/79.5 P, 79.5 GE, 79.5 GC, 196 B, 196 P

[56] References Cited

U.S. PATENT DOCUMENTS 1,825,555  9/1931  Stern ........................ 188/196 B UX
2,822,893  2/1958  Flueler ........................... 188/196 B

FOREIGN PATENT DOCUMENTS 760,973  6/1953  Germany ........................ 188/196 P Primary Examiner—Duane A. Reger
Attorney, Agent, or Firm—Sughrue, Rothwell, Mion, Zinn and Macpeak

[57] ABSTRACT

An internal shoe drum brake is provided with an automatic shoe adjusting device comprising a strut extending between the shoes; said strut being coupled to one shoe through a lost motion coupling and to the other shoe through a one-way coupling device comprising a cam rocker lever pivoted on one shoe. The end of the rocker lever opposed to the cam surface is connected through a tension spring to the other shoe.

4 Claims, 7 Drawing Figures

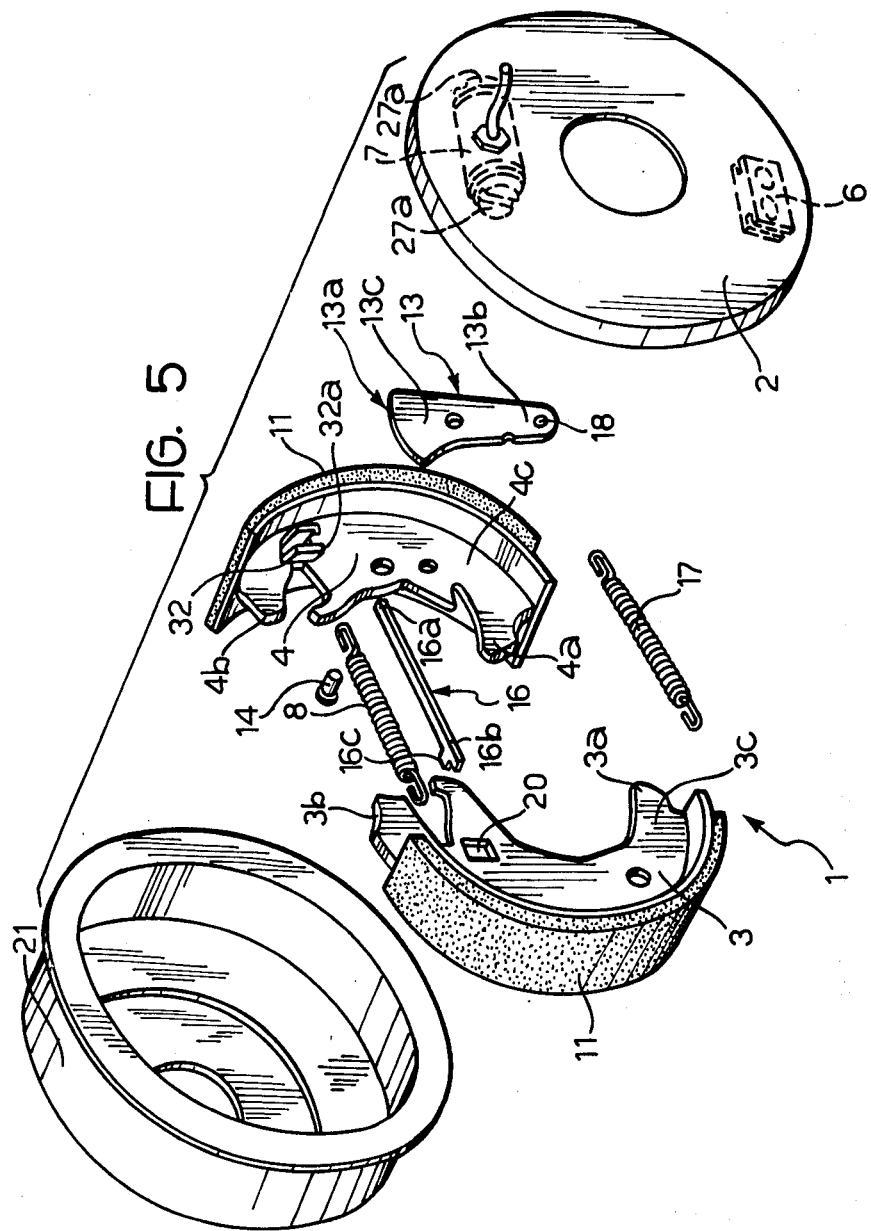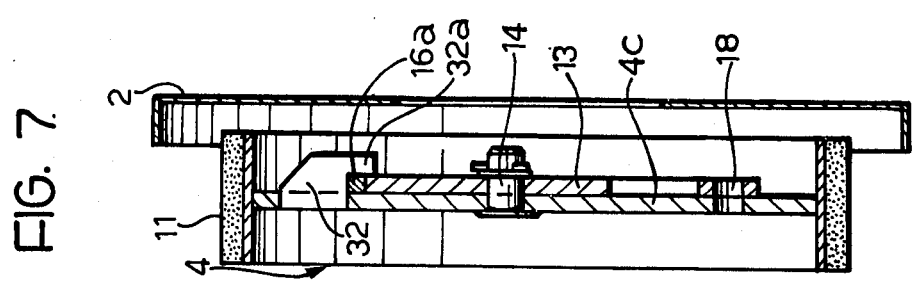

DEVICE FOR AUTOMATICALLY COMPENSATING FOR WEAR IN THE BRAKING SYSTEMS OF MOTOR VEHICLES

The present invention relates to an internal shoe drum brake including two shoes carried by a back plate, each shoe including a rim portion provided with a friction lining and a flat web, and pull-off springs urging the brake shoes away from the surrounding drum, said brake being provided with an automatic shoe adjusting device comprising:

a projection carried by the web of one of the two shoes, a pivoted locking member hinged on said web and having a cam surface facing said projection, an elengated rod extending between the two shoes and having one end inserted between said projection and said cam surface of said locking member and its other end being connected to the web of the other shoe through a lost motion coupling allowing limited relative movement between said rod and said shoe in the direction of the length of said rod, resilient means operating on said locking member and tending to cause it to rotate in a direction such that one end of said rod is locked between said projection and said cam surface.

According to British Pat. No. 1,397,122, the locking member is constituted by a plate hinged on one of the two shoes and the resilient means are constituted by a blade spring secured to one of the edges of the plate. The free end of said flat spring acts against the inner surface of the rim portion of the same shoe.

When through the effect of wear on the braking surface the approaching stroke of the shoes on the drum exceeds the value which corresponds to the stroke of the rod allowed by said lost motion coupling, the rod itself is freed from engagement exercised by the locking member and slides with respect to said member. When the shoes, through the action of the pull-off springs are recalled to their non-braking position, their return stroke is reduced by the fact that the rod, which has been moved axially in the braking stroke, cannot return to its initial position. During its return, in fact, the rod is moved in the same direction as that of the action of the resilient means acting on the locking member, whereby said means, cause the locking member to lock the adjacent end of the rod.

With increased wear, the distance between the shoes on their non-braking position correspondingly increases. There also, consequently, varies, tending to increase, the recall force exerted by the pull-off springs on the shoes. Because this force operates against the action of the locking means, there is, consequently, produced the inconvenience that the increase of the said force does not correspond to a proportional increase in the force exercised by the locking means, which remains unchanged. There is, thus, a delay in the locking operation of the rod and this delay tends to increase with increasing wear of the braking surfaces.

The aim of the present invention is to provide a device of the type described which does not present the said inconvenience.

To satisfy this aim the present invention has as its object an internal shoe drum brake of the type described characterized by the fact that the locking member is a rocker type lever one end of which is provided with said cam surface, and that the resilient means operating on said locking member are tension spring means which extend between the two shoes and are connected at one end to the end of the rocker lever opposite the end carrying the cam surface and at the other end to the web of said other shoe.

The fact that resilient tension means are connected at one end to the rocker lever carried by one of the two shoes and at the other end to the other shoe, allows that the locking force exerted by said resilient means increases with increasing distance between the two shoes. Further, said resilient tension means cooperate with the pull-off springs of the brake to urge the brake shoes away from the surrounding drum, thus affording a simplified construction of the brake.

The fact that said resilient tension means act on a rocker lever further permits the obtaining of a locking force on the corresponding end of the rod to be conveniently amplified, with assures a very rapid and safe operation of the device.

Figure 2:
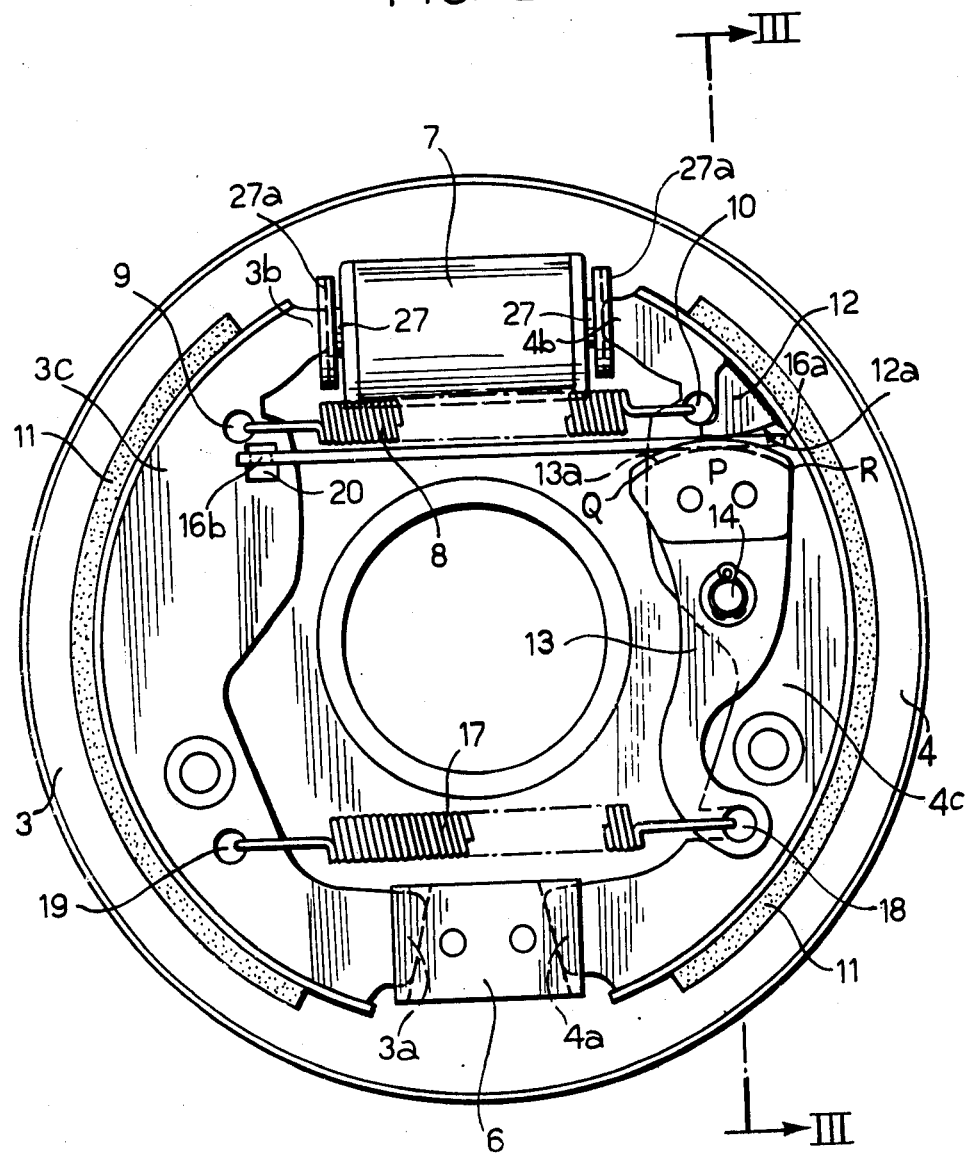
Figure 4:
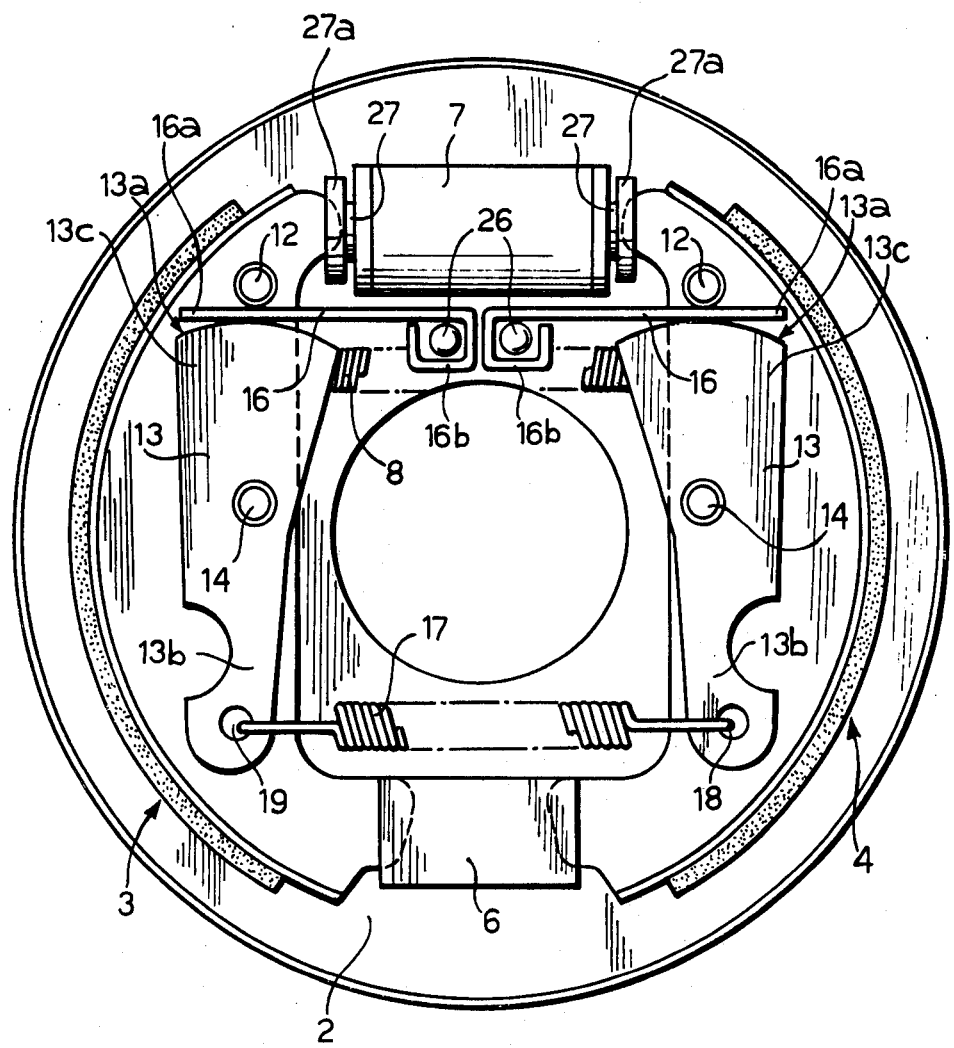

The invention will now be more fully described by way of non-limitative examples only, with reference to the accompanying drawings, in which:

FIG. 1 is an exploded view of the principal elements which form a drum brake of the internal shoe type for motor vehicles provided with a device according to the invention, FIG. 2 is a front elevational view of part of the elements of FIG. 1 illustrated in their mounted condition, FIG. 3 is a sectional view taken along line III—III of FIG. 2, FIG. 4 illustrates a variant of FIG. 2, FIG. 5 is an exploded view of the principal elements which form a brake mechanism of the internal shoe type for motor vehicles provided with a device according to a further embodiment of the invention.

Figure 6:
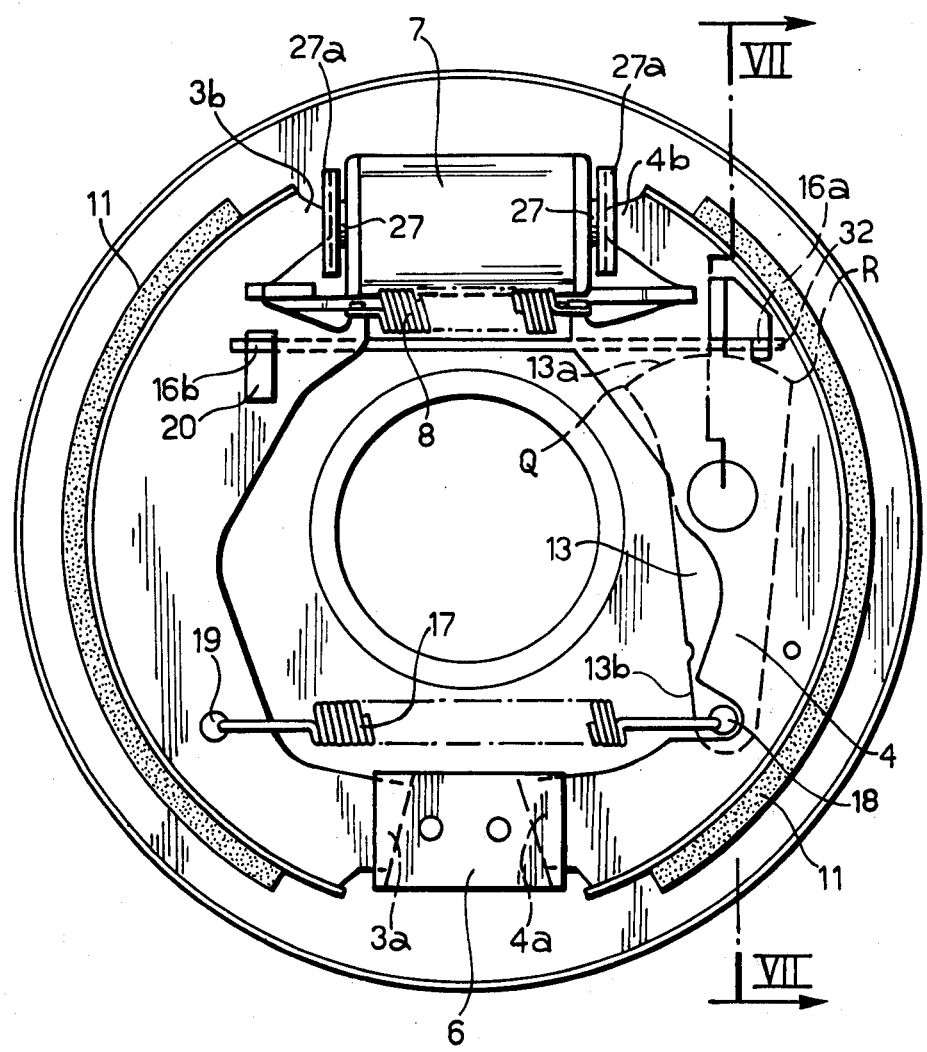

FIG. 6 is a front elevational view of part of the elements of FIG. 5 in their mounted condition, and FIG. 7 is a sectional view taken along line VII—VII of FIG. 6.

The numeral 1 indicates a drum brake of the internal shoe type for motor vehicles. The numeral 2 indicates a backing plate fixed, in its operating condition, to the fixed structure of a vehicle (not illustrated). The plate 2 supports a pair of shoes 3 and 4, disposed in opposite symmetrical position to one another and having fixed on their rim portions a friction lining 11. The shoes 3 and 4 are each provided with a web 3c and 4c respectively. The two webs 3c and 4c are engaged, as per se known, at one of their ends, indicated respectively as 3a and 4a, in a block 6 integral with the support plate 2. The opposite ends 3b and 4b of the webs 3c and 4c abut the enlarged ends 27a of two equal and opposite pistons 27 provided, as per se known, in a liquid-pressure wheel cylinder 7. A tension helical spring 8, whose opposite ends are engaged in two holes 9 and 10 provided in the webs 3c and 4c respectively, is opposed to the action of the said pistons, and urges the ends 3b and 4b of the webs 3 and 4 together. The web 4c is provided, in proximity to its free end 4b with a projection 12. The end surface 12a of the projection 12 turned towards the hinged end 4a of the shoe 4 presents a curved profile. The shoe 4 is further provided, in its intermediate zone, with a pin 14 on which there is hinged in a central position a cam lever of the rocker type 13. The cam surface 13a of the lever 13 is provided on the edge of an end 13c of the lever 13 in a position facing the curved profile 12a of the projection 12. Between the working surface 13a of the lever 13 and the curved profile 12a of the projection 12 there is inserted an end 16a of a rod 16. The opposite end 16b of the rod 16 is provided with a lateral projection 16c housed, in operating conditions, in a slot 20 provided in the web 3c. The rod 16 is substantially directed along the direction in which the part adjacent the shoe 4 is moved. In this way, during the braking operation, the shaft 16, whose end 16a is normally carried by the two opposite profiles 13a and 12a, is moved in a direction substantially parallel to its own axis. The cam lever 13 is provided, on its end 13b opposite its cam surface 13a, with a hole 18 into which an end of a tension helical spring 17 is inserted. The opposite end of such spring is inserted in a hole 19 provided in the web 3c. The action of the spring 17 on the cam lever 13 tends to cause it to rotate around the pin 14 in such a way as to cause the cam surface 13a to move away from the shoe 3. By the letter P there is indicated the point of contact between the cam surface 13a and the adjacent surface of the end 16a of the rod 16. The cam surface 13a comprises a first arc PQ extending towards the shoe 3 and a second arc PR extending from the point P in a direction opposed to that of the first arc. The bending radius of the first arc PQ is greater than the distance between the point P and the axis C of the pin 14. The bending radius of the second arc PR is, on the other hand, smaller than said distance. In this way, the movement with respect to the shoe 4 of the end 16a of the rod 16 in the direction towards the slot 20 of the shoe 3 is permitted while the movement in the opposite direction is impeded by frictional drag which is produced in the contact point P of the end 16a with the working surface 13a.

The device functions as follows. During the braking operation the two shoes 3 and 4 move away from each other to effect the approach stroke at the internal surface of the cylinder 21. During this operation the rod 16 is dragged integrally by the shoe 4 through which the lateral projection 16c integral with said shaft slides internally of the slot 20. The magnitude of such slot is such as to permit a displacement of the transverse projection in the direction parallel to the rod 16, of a value substantially equal to the normal approach stroke provided for the two shoes 3 and 4. When, following successive braking operations, the friction lining 11 on the rims of the shoes 3 and 4 becomes worn, the approach stroke of the said shoes would, without the intervention of the device described, correspondingly increase. With the intervention of the automatic shoe adjusting device, on the other hand, for each increase in the approach stroke the slot 20 engages with the lateral projection 16c producing on the lateral projection a dragging action tending to cause the rod 16 to slide with respect to the shoe 4 in the direction permitted as defined above. Because the sliding of the shaft 16 thus produced is irreversible, when, lacking pressure in the cylinder 7, the shoes 3 and 4 tend, through the effect of the spring 8, to return to their rest position, the shoes are disposed in a new rest position at a reciprocal distance which is increased by a quantity equal to that of the sliding of the abovementioned rod. In this way, the following approach stroke of the shoes 3 and 4 is substantially unvaried and is practically that defined by the movement of the lateral projection 13c within the slot 20.

In the variant of FIG. 4 the elements common with that of FIG. 1 are indicated with the same numerals. The device illustrated in FIG. 4 differs from that of FIG. 3 in that there are two levers 13, one for each of the shoes 3 and 4, both provided with its own cam surface 13a. Each lever 13 has at the end 13b opposite its working surface 13a a hole 18 in which there is engaged an end of the spring 17: this spring, however, operates in this case on both the levers 13. At the cam surface 13a of each lever 13 there is a facing cylindrical projection 12. Between each projection 12 and the facing working surface 13a of the respective lever 13 there is inserted an end 16a of a rod 16 whose opposite end 16b is eye-shaped. The two ends 16b of the two rods 16 are adjacent to each other and each is engaged with a play in a cylindrical block 26 carried by the plate 2 integral with the structure of the vehicle.

In the variant illustrated in FIGS. 5, 6 and 7 a rocker lever 13 is interposed between the corresponding web 4c and the backing plate 2. In this way the spring 17 urges the shoes 3 and 4, against the backing plate 2, thus eliminating possibilities of vibrations in the shoes themselves. In this variant, further, the projection is formed by a tongue 32 which is cut-out and outwardly bent during the pressing of the corresponding shoe so as to form an element with an inverted L-shaped profile. The vertical portion 32a of the tongue 32 is parallel with the web 4c and spaced therefrom. In this way the vertical portion 32a serves to hold the end 16a of the rod 16 in its correct position.

Naturally, the principle of the invention having been established, the forms of realization and particulars of execution can be widely varied with respect to the embodiments described and illustrated above without departing from the scope of the present invention.

I claim:

1. In a drum brake of the type having a pair of arcuate brake shoes pivotally mounted on a stationary backing plate for movement into and out of engagement with a rotatable brake drum surrounding said brake shoes with each brake shoe including a rim portion provided with a friction lining and a flat web portion, actuating means disposed between opposed ends of said brake shoes for moving said brake shoes into frictional engagement with said drum and spring means for retracting said brake shoes away from said drum, the improvement comprising automatic wear compensating shoe adjusting means including a projection carried by the web of one of the two shoes and having a curved surface lying in a plane parallel to said web, a locking lever pivotally connected to said web for pivotal movement in the plane of the curved surface of said projection and having a cam surface on the end of said lever facing said curved surface of said projection, an elongated rod extending between said two shoes and having one end inserted between said curved surface of said projection and said cam surface of said locking lever and the other end of said rod being connected to the web of the other shoe through a lost motion coupling allowing limited relative movement between said rod and said other shoe in the direction of the length of said rod and resilient means having one end thereof operatively connected to said other shoe with the opposite end of said resilient means being connected to said locking lever adjacent the end opposite said cam surface whereby said resilient means will also exert a retracting force on said brake shoes in addition to rotating said locking lever in a direction such that said one end of said rod is locked between said curved surface of said projection and said cam surface.

2. In a drum brake as set forth in claim 1 wherein said opposite end of said resilient means is connected directly to the web of the other of said two brake shoes.

3. In a drum brake as set forth in claim 1 wherein said locking lever is disposed between the web of said shoe to which it is pivotally connected and said backing plate.

4. In a drum brake of the type having a pair of arcuate brake shoes pivotally mounted on a stationary backing plate for movement into and out of engagement with a rotatable brake drum surrounding said brake shoes with each brake shoe including a rim portion provided with a friction lining and a flat web portion, means disposed between opposed ends of said brake shoes for moving said brake shoes into frictional engagement with said drum and spring means for retracting said shoes away from said drum, the improvement comprising automatic wear compensating shoe adjusting means including a projection carried by the web of each shoe with each projection having a curved surface lying in a plane parallel to said web, a locking lever pivotally connected to the web of each shoe for pivotal movement in the plane of the curved surface of the respective projection and having a cam surface on one end facing said curved surface of said projection, two axially aligned elongated rods extending between said shoes with one end of each rod being disposed between said curved surface of a projection and the cam surface of the lever on each shoe, lost motion coupling means mounted on said backing plate between said shoes for engaging the opposite ends of said rods which are disposed adjacent each other and resilient means connected between the ends of said levers opposite the ends having the cam surfaces thereon.

\* \* \* \* \*